Patented Dec. 17, 1940

2,224,847

UNITED STATES PATENT OFFICE 2,224,847

CELLULOSE ETHER COMPOSITION

Shailer L. Bass, Toivo A. Kauppi, and Clarence L. Moyle, Midland, Mich., assignors to The Dow Chemical Company, Midland, Mich., a corporation of Michigan No Drawing. Application July 17, 1939, Serial No. 284,954

11 Claims. (Cl. 106—40)

This invention concerns new plastic compositions comprising cellulose ethers treated with certain complex triaryl phosphates.

Cellulose ethers are known to possess a number of properties such as low flammability, exceptional stability against hydrolysis or deterioration on ageing, etc., which render them desirable plastic materials for the preparation of films, lacquers, molded articles, etc. In preparing such products from any cellulose derivative, e. g. cellulose nitrate or a cellulose ester or ether, a plasticizing agent is usually incorporated for the purpose of rendering the material more readily moldable at elevated temperatures or to lend certain characteristics, e. g. increased toughness, pliability, or elasticity, etc., to the final product. The kind and proportion of plasticizer to use are dependent, of course, on the type of cellulose derivative employed and the particular properties desired in the product. A given substance may be an effectual plasticizer for cellulose esters but not for cellulose ethers, and plasticizing agents frequently differ markedly from one another as regards the properties which they lend to a particular cellulose derivative.

Most plasticizers have the effect of lowering the yield point, tensile strength, and hardness of a cellulose derivative and these effects become more pronounced as the proportion of plasticizing agent is increased. Accordingly, care must be exercised to employ a plasticizing agent which will have the desired plastifying action, e. g. to increase the pliability, elasticity, ductility, or ability to be molded, etc., without excessively softening or weakening the product.

Cellulose ethers are inherently softer, tougher, and more ductile than nitrocellulose or other cellulose esters wherein the hydroxy groups of the original cellulose have been replaced to like extent. When unplasticized, they are sufficiently hard for most purposes, but the presence of a plasticizer is required when the ether is to be molded. However, the plasticizers for cellulose ethers heretofore known, when employed in the proportions necessary to obtain satisfactory plasticity, soften the ethers to such extent as to render them unsuited for the preparation of molded objects which must resist wear, e. g. cigarette cases, combs, etc.

An object of this invention is to provide certain new agents which, when incorporated with cellulose ethers, modify the properties of the latter in several different ways. When a moderate proportion, e. g. less than 50 per cent by weight, of one of the new agents is incorporated with a cellulose ether, a composition is obtained which at molding temperatures is more plastic than the cellulose ether alone, but which at room temperature is nearly as strong and hard as (and in many instances is stronger and harder than) the cellulose ether alone. As the proportion of such agent is increased, e. g. to between 50 and 100 per cent of the weight of the ether, plasticization of the latter becomes observable even at room temperature. Since at the usual molding temperatures, the new agents used in treating cellulose ethers always function as plasticizers, such agents are hereinafter referred to generically as "plasticizers" or "plasticizing agents." From the facts just presented, it will be understood that at room temperature, the new agents sometimes function primarily as hardening and strengthening agents for the cellulose ethers and the plasticizing action is of minor consequence.

Another object of the invention is to provide new plastic compositions, comprising a cellulose ether and one or more of the new plasticizers. A particular object is to provide such new compositions having good strength characteristics and having a hardness nearly as great, and in some instances greater than that of the cellulose ethers alone. Other objects will be apparent from the following description of the invention.

The plasticizing agents provided by the invention are complex triaryl phosphates having the general formula

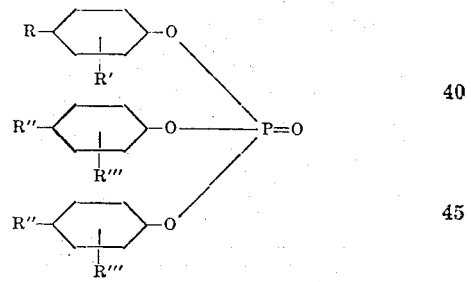

wherein R is a cycloalkyl radical or another hydrocarbon radical attached through a tertiary carbon atom to the benzene nucleus; R' is a tertiary alkyl, cycloalkyl, or aryl radical; R" is hydrogen, a cycloalkyl radical, or a hydrocarbon radical attached through a tertiary carbon atom to the benzene nucleus; R'" is hydrogen or a tertiary alkyl, cycloalkyl, or aryl radical; and at least two of the benzene nuclei contain hydrocarbon substituents of the types just named, the total number of such hydrocarbon substituents on the three benzene nuclei attached directly to the phosphate radical being at least four. Examples of the hydrocarbon radicals designated by each of the above symbols R and R" are,

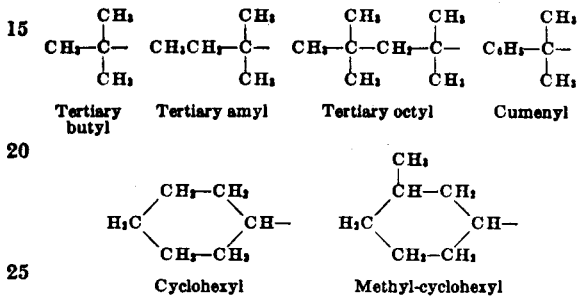

Examples of hydrocarbon radicals represented by each of the symbols R' and R'" are the tertiary butyl, tertiary amyl, tertiary octyl, cyclohexyl, and methyl-cyclohexyl groups just shown and the following additional radicals: phenyl, naphthyl, methyl-phenyl, ethyl-phenyl, ethyl-cyclohexyl, etc. Illustrations of plasticizing agents having the above general formula are: phenyl-di-(4-cumenyl-2-phenyl-phenyl) phosphate; 4-cumenyl-phenyl di-(2-cyclohexyl-4-tertiarybutylphenyl) phosphate; 2-cyclohexyl-4-tertiarybutylphenyl di-(4-tertiaryoctyl-phenyl) phosphate; phenyl di-(2-cyclohexyl-4-phenyl-phenyl) phosphate; tri-(2-phenyl-4-tertiarybutyl-phenyl) phosphate; phenyl di-(4-cyclohexyl-2-phenyl-phenyl) phosphate; etc.

The phosphates having the foregoing general formula are in most instances viscous oils or solid resins at room temperature. They are non-flammable and when incorporated with cellulose ethers have the effect of markedly reducing flammability of the latter. They are readily soluble in cellulose ethers and also in most solvents (e. g. aromatic hydrocarbons and chlorinated hydrocarbons, such as benzene, toluene, xylene, chlorobenzene, ortho-dichlorobenzene, chloroform, ethylene chloride, etc., and their mixtures with alcohols, esters, and ketones) commonly used as lacquer solvents. They not only are effective plasticizers for the cellulose ethers, but may be employed in proportions as high as 40 per cent of the weight of the ether without softening the latter appreciably. In many instances, particularly when employing the phosphates in a proportion of about 20 per cent of the weight of the ethers, the plasticized products are considerably harder than the cellulose ethers alone. In all instances as yet tested, the incorporation of 40 per cent by weight or less of such phosphate with a cellulose ether has resulted in formation of a product having a hardness at least 90 per cent as great as that of the cellulose ether alone. In this connection, it will be noted that each phosphate employed as a plasticizer according to this invention is a derivative of triphenyl phosphate having at least four hydrocarbon substituents of certain specified types on the benzene nuclei. The presence of these four or more substituents is important, since we have found that when a triphenyl phosphate derivative containing three or less such substituents is used as the plasticizer for a cellulose ether in the proportions necessary to obtain good plasticity, considerable softening of the ether occurs.

In some instances, particularly when the plasticized compositions are to be employed under conditions where considerable flexibility at room temperature is desired, e. g. when the compositions are to be applied as insulating coatings on wires or cables, it may be desirable to employ the plasticizing agent in proportions greater than those above mentioned, e. g. in proportions representing from 50 to 100 per cent of the weight of the cellulose ether. The plasticized cellulose ether compositions containing the plasticizing agents in the proportions just stated are usually somewhat softer, weaker and more flexible than the cellulose ethers alone, but they are, in all instances, considerably stronger and harder than the compositions obtained by treating the same cellulose ethers with similar proportions of other triaryl phosphates such as the previously known plasticizing agents, triphenyl phosphate and tricresyl phosphate. In fact, the treatment of ethylcellulose with more than 50 per cent of its weight of triphenyl phosphate or tricresyl phosphate usually results in a composition which is cheesy at room temperature. The new plasticizers provided by the invention should, of course, not be used in a proportion sufficient to cause cheesiness at room temperature but, as just pointed out, when they are employed in amounts equal to the weight of the cellulose ether treated, the extruded plastic compositions have a hardness and flexibility which is quite satisfactory for extruded wire coverings.

The cellulose ethers employed according to the invention are preferably etherified sufficiently to render the same soluble in the organic solvents hereinbefore mentioned and suitably contain two or more etherified hydroxyl groups per anhydroglucose unit. Among the various cellulose ethers which may be used are ethyl cellulose, isopropyl cellulose, n-propyl cellulose, butyl cellulose, ethyl-butyl cellulose, ethyl-lauryl cellulose, benzyl cellulose, ethyl-benzyl cellulose, etc.

The phosphate plasticizers may be incorporated with cellulose ethers in any of the usual ways, e. g. by mixing the ether and plasticizer and kneading or rolling the mixture at elevated temperatures; by dissolving the ether and plasticizer in a mutual solvent and thereafter removing the solvent; etc. When molded or extruded articles such as cups, buttons, wire coatings, etc., are to be made from the plasticized composition, the latter is preferably, although not necessarily, prepared in the absence of solvents as follows: A cellulose ether is mixed with the desired proportion of one of the hereinbefore mentioned phosphates and the mixture is passed repeatedly through heated compounding rolls until a homogeneous composition is obtained. Usually temperatures from 100° to 160° C. produce a workable composition. The latter is then extruded or molded.

When sheets or films are to be produced, the composition is preferably prepared by dissolving a cellulose ether in a volatile solvent which is also capable of dissolving the phosphate plasticizer, and the phosphate is added in the proportion necessary to give the desired plasticizing effect, usually in a proportion representing from 5 to 100 per cent and preferably from 5 to 40 per cent of the weight of the ether. The resultant solution, which preferably is quite viscous, may be spread on an even surface and the solvent evaporated to leave a sheet, or it may be drawn directly into films or threads under conditions which provide for rapid evaporation of the solvent. The films so produced are clear and transparent and are nearly as hard, and in many instances harder, than the cellulose ether alone.

The following examples illustrate various ways in which the principle of the invention has been applied but are not to be construed as limiting the invention.

Example 1

This example consists of a number of experiments wherein films were prepared by incorporating certain triaryl phosphates with separate samples of the same quality of ethyl-cellulose and the physical properties of the resultant films were determined. The procedure employed in preparing and testing each film was as follows: Ethyl cellulose was dissolved in a mixed solvent consisting of 80 parts by volume of toluene and 20 parts of ethanol to form an approximately 15 per cent by weight solution thereof. The phosphate specified in the following table, which describes the properties of each film obtained, was added in the proportion stated and the resultant solution was drawn into films in accordance with the procedure described in Ind. & Eng. Chem. 29, 681 (1937). Each proportion of plasticizer is given in terms of per cent of the weight of ethyl cellulose employed. The film so obtained possessed the yield point in kilograms tension per square centimeter cross section of film, the tensile strength in the same units, and the hardness index number given in the table. By "hardness index number" is meant the hardness of the film expressed as per cent of the hardness of an unplasticized but otherwise similar film of ethylcellulose. In determining such hardness index number, each film of known dimensions was subjected to a gradually increased tension until the film had been stretched well beyond its limit of elasticity and the "yield point" determined. The term "yield point" as herein employed means the kilograms of tension per square centimeter of original cross section of film at which the deformation of the latter increases rapidly without any increase in the tension. In other words, it is the stress at which stress increments are entirely absorbed by stretching. Hardness is usually measured by the amount of deformation under a given load. Since the "yield point" of all of these films occurred at practically identical deformation, or percentage elongation, it was used as a basis for comparing their relative hardness. The tensile strength is the tension in kilograms per square centimeter of original cross section of the film sustained at the point of rupture. The per cent elongation is the per cent of the original length of a film by which it may be elongated under tension before breakage occurs. Experiments 1–5 of the following table describe films having compositions outside the scope of the invention and are presented for purpose of comparison with the data in experiments 6–19 which describe films having the compositions required by the invention. Experiment 1 describes a film consisting of ethylcellulose alone and experiments 2–4 describe films of ethylcellulose plasticized with the stated proportions of the previously known plasticizers, triphenyl phosphate and tricresyl phosphate, respectively.

Table I

| Exp. No. | Plasticizer Formula | Percent | Yield point, kg./cm.² | Tensile strength, kg./cm.² | Percent elongation | Hardness index No. |
|---|---|---|---|---|---|---|
| 1 | None | | 475 | 630 | 31 | 100 |
| 2 | $(\mathrm{C_6H_5{-}O{-}})_3 P{=}O$ | 15 | 310 | 470 | 30 | 65 |
| 3 | $(\mathrm{C_6H_5{-}O{-}})_3 P{=}O$ | 40 | 100 | 130 | 36 | 21 |
| 4 | $(\mathrm{CH_3{-}C_6H_4{-}O{-}})_3 P{=}O$ | 15 | 320 | 525 | 46 | 67 |
| 5 | $(\mathrm{CH_3{-}C_6H_4{-}O{-}})_3 P{=}O$ | 40 | 100 | 130 | 36 | 21 |
| 6 | $\left((CH_3)_3C{-}\underset{C_5H_5}{C_6H_3}{-}O{-}\right)P(=O)\left({-}O{-}C_6H_4{-}C(CH_3)_3\right)_2$ | 15 | 550 | 690 | 31 | 124 |
| 7 | $\left((CH_3)_3C{-}\underset{C_5H_5}{C_6H_3}{-}O{-}\right)P(=O)\left({-}O{-}C_6H_4{-}C(CH_3)_3\right)_2$ | 40 | 530 | 600 | 27 | 111 |
| 8 | $\left((CH_3)_3C{-}\underset{C_5H_5}{C_6H_3}{-}O{-}\right)P(=O)\left({-}O{-}C_6H_4{-}C(CH_3)_3\right)_2$ | 96.5 | 235 | 235 | 35 | 60 |
| 9 | $\left((CH_3)_3C{-}\underset{C_6H_5}{C_6H_3}{-}O{-}\right)P(=O)\left({-}O{-}\underset{C_6H_5}{C_6H_3}{-}\right)_2$ | 15 | 480 | 690 | 38 | 101 |

| Exp. No. | Plasticizer Formula | Percent | Yield point, kg./cm.² | Tensile strength, kg./cm.² | Percent elongation | Hardness index No. |
|---|---|---|---|---|---|---|
| 10 | $(CH_3)_3C\text{-}C_6H_3(C_6H_5)\text{-}O\text{-}P(=O)(\text{-}O\text{-}C_6H_3(C_6H_5))_2$ | 40 | 425 | 510 | 26 | 90 |
| 11 | $(CH_3)_3C\text{-}C_6H_3(C_6H_5)\text{-}O\text{-}P(=O)(\text{-}O\text{-}C_6H_4\text{-}C(CH_3)_3)_2$ | 15 | 505 | 695 | 35 | 106 |
| 12 | $(CH_3)_3C\text{-}C_6H_3(C_6H_5)\text{-}O\text{-}P(=O)(\text{-}O\text{-}C_6H_3(C_6H_5)\text{-}C(CH_3)_3)_2$ (mixed) | 40 | 455 | 500 | 28 | 96 |
| 13 | $((CH_3)_3C\text{-}C_6H_3(C_6H_5)\text{-}O\text{-})_2P(=O)\text{-}O\text{-}C_6H_5$ | 15 | 490 | 660 | 32 | 103 |
| 14 | $((CH_3)_3C\text{-}C_6H_3(C_6H_5)\text{-}O\text{-})_2P(=O)\text{-}O\text{-}C_6H_5$ | 40 | 430 | 545 | 28 | 91 |
| 15 | $((CH_3)_3C\text{-}C_6H_3(C_6H_5)\text{-}O\text{-})_2P(=O)\text{-}O\text{-}C_6H_4\text{-}C(CH_3)_3$ | 15 | 550 | 650 | 27 | 116 |
| 16 | $((CH_3)_3C\text{-}C_6H_3(C_6H_5)\text{-}O\text{-})_2P(=O)\text{-}O\text{-}C_6H_4\text{-}C(CH_3)_3$ | 40 | 605 | 605 | 10 | 127 |
| 17 | $((CH_3)_3C\text{-}C_6H_3(C_6H_5)\text{-}O\text{-})_2P(=O)\text{-}O\text{-}C_6H_4\text{-}C(CH_3)_3$ | 100 | 328 | 328 | 37 | 69 |
| 18 | $((CH_3)_3C\text{-}C_6H_3(C_6H_5)\text{-}O\text{-})_2P(=O)\text{-}O\text{-}C_6H_4\text{-}C_6H_5$ | 15 | 515 | 600 | 25 | 108 |
| 19 | $((CH_3)_3C\text{-}C_6H_3(C_6H_5)\text{-}O\text{-})_2P(=O)\text{-}O\text{-}C_6H_4\text{-}C_6H_5$ | 40 | 520 | 530 | 21 | 109 |
| 20 | $(CH_3\text{-}C(CH_3)_2\text{-}CH_2\text{-}C(CH_3)_2\text{-}C_6H_3(C_6H_5)\text{-}O\text{-})_3P=O$ | 15 | 540 | 690 | 34 | 114 |
| 21 | $(CH_3\text{-}C(CH_3)_2\text{-}CH_2\text{-}C(CH_3)_2\text{-}C_6H_3(C_6H_5)\text{-}O\text{-})_3P=O$ | 40 | 550 | 620 | 32 | 116 |

Example 2

A 15 per cent by weight solution of benzyl cellulose in a mixed solvent consisting of 50 parts by volume toluene, 20 parts ethyl alcohol, and 30 parts butyl acetate was prepared. Separate portions of this solution were treated with the respective phosphates shown in the following table, which also gives each proportion of phosphate in terms of per cent of the weight of benzyl cellulose present in the sample under treatment. A film approximately 0.04 millimeter thick was cast in usual manner from each solution and the tensile strength and hardness index number, i. e. hardness of the film expressed as per cent of the hardness of an unplasticized but otherwise similar film of benzyl cellulose, were determined. Table II below gives the tensile strength and hardness index number of each such plasticized film and, for purpose of comparison, the corresponding values of a film of unplasticized benzyl cellulose. Experiments 2–5 of the table describe films of benzyl cellulose plasticized with the stated proportions of the known plasticizers, triphenyl phosphate and tricresyl phosphate, and are also presented for purpose of comparison with experiments 6–13 which describe films of benzyl cellulose plasticized with the new plasticizers provided by the invention.

Table II

| Exp. No. | Plasticizer Formula | Plasticizer Percent | Yield point, kg./cm.² | Hardness index No. |
| --- | --- | --- | --- | --- |
| 1 | None | | 420 | 100 |
| 2 | $(C_6H_5-O-)_3P=O$ | 15 | 200 | 48 |
| 3 | $(C_6H_5-O-)_3P=O$ | 40 | Too soft to measure | |
| 4 | $(CH_3-C_6H_4-O-)_3P=O$ | 15 | 170 | 40 |
| 5 | $(CH_3-C_6H_4-O-)_3P=O$ | 40 | Too soft to measure | |
| 6 | $[(CH_3)_3C-C_6H_3(C_6H_5)-O-P(O)(-O-C_6H_4-C(CH_3)_3)_2]_?$ | 15 | 465 | 110 |
| 7 | $[(CH_3)_3C-C_6H_3(C_6H_5)-O-P(O)(-O-C_6H_4-C(CH_3)_3)_2]$ | 40 | 400 | 95 |
| 8 | $[(CH_3)_3C-C_6H_3(C_6H_5)-O-]_2 P(O)-O-C_6H_4-C(CH_3)_3$ | 15 | 500 | 119 |
| 9 | $[(CH_3)_3C-C_6H_3(C_6H_5)-O-]_2 P(O)-O-C_6H_4-C(CH_3)_3$ | 40 | 515 | 123 |
| 10 | $[(CH_3)_3C-C_6H_3(C_6H_5)-O-]_2 P(O)-O-C_6H_4(C_6H_5)$ | 15 | 500 | 119 |
| 11 | $[(CH_3)_3C-C_6H_3(C_6H_5)-O-]_2 P(O)-O-C_6H_4(C_6H_5)$ | 40 | 500 | 119 |
| 12 | $[(CH_3)_3C-C_6H_3(C_6H_5)-O-]_3 P=O$ | 15 | 505 | 120 |
| 13 | $[(CH_3)_3C-C_6H_3(C_6H_5)-O-]_3 P=O$ | 40 | 480 | 114 |

Example 3

The purposes of this example are to compare the molding properties of a cellulose ether containing the new complex phosphate plasticizers hereinbefore specified with those of the same cellulose ether plasticized with triphenyl phosphate and also to describe the physical properties of the molded products. Each molding composition used in this example was prepared by thoroughly mixing 200 grams of ethyl-cellulose, which was ethylated to an ethoxyl content of 48.5 per cent by weight (corresponding to about 2.5 etherified hydroxy groups per anhydro-glucose unit), 40 grams of the phosphate in Table III below, and 350 cubic centimeters of a solvent consisting of 2 parts by volume of benzene and 1 part of methanol. A viscous doughy mass resulted. This mass was spread in pans and the solvent was evaporated therefrom under vacuum. The resultant slabs of material were passed repeatedly through heated rolls to remove any residual solvent. During this operation, 4 grams of montan wax was added and mixed thoroughly with the plastic material. Each slab was then cooled and ground to a granule size suitable for molding. A sample of each granular material was tested to determine its flow characteristics under actual molding conditions, the apparatus used in these tests being the Olsen-Bakelite flow tester described in U. S. Patent No. 2,066,016 and the procedure being essentially that described by Penning and Meyer on page 26 of the A. S. T. M. bulletin concerning the symposium on plastics at the Rochester regional meeting of March 9, 1938. It was found that the composition described in experiment 1 of the following Table III, i. e. the composition containing the previously known plasticizer, triphenyl phosphate, possessed a high rate of flow at a given molding temperature but produced a molding that was too soft for most purposes. The compositions of experiments 2–5 in Table III, i. e. those containing the new plasticizers provided by the invention, possessed flow rates of the order given in the above Penning and Meyer publication as ideal for injection molding purposes and produced moldings having a hardness satisfactory for most purposes.

Another sample of each molding composition was compression molded at a temperature of about 205° C. and under pressure of 7 tons per square inch into test pieces of dimensions 0.5 inch x 0.5 inch x 4 inches and the physical properties of the test pieces were determined. Table III gives for each test piece the hardness on Shore Scleroscope hardness basis, the tensile strength, the heat distortion as determined by the methods given in A. S. T. M. D—48—36 entitled "Standard methods of testing molded materials used for electrical insulation."

then compression molded into test pieces as in Example 3 and the impact strength and Shore hardness of each piece were determined. It was noted that the powders molded well and that the molded test pieces hardened rapidly on cooling and could be ejected without difficulty from the mold. Table IV states the phosphate plasticizer present in each test piece and gives the impact strength and hardness of the piece.

*Table IV*

| Exp. No. | Plasticizer | Impact strength, in.-lbs./sq. in. | Shore hardness |
|---|---|---|---|
| 1 | ((CH₃)₃C–⌬(C₆H₅)–O–)₂P(=O)–O–⌬–C(CH₃)₃ | 2.4 | 76.8 |
| 2 | (CH₃)₃C–⌬(C₆H₅)–O–P(=O)(–O–⌬(C₆H₅))₂ | 2.4 | 78.3 |
| 3 | ((CH₃)₃C–⌬(C₆H₅)–O–)₂P(=O)–O–⌬ | 1.25 | 69.8 |
| 4 | (CH₃)₃C–⌬(C₆H₅)–O–P(=O)(–O–⌬–C(CH₃)₃)(–O–⌬–C₆H₅) | 2.3 | 70.0 |

*Table III*

| Exp. No. | Plasticizer | Tensile strength, lbs./sq. in. | Shore hardness | Heat distortion, °C. |
|---|---|---|---|---|
| 1 | (⌬–O–)₃P=O | 3,500 | 51 | 49 |
| 2 | (CH₃)₃C–⌬(C₆H₅)–O–P(=O)(–O–⌬–C(CH₃)₃)₂ | 5,700 | 80 | 58 |
| 3 | ((CH₃)₃C–⌬(C₆H₅)–O–)₂P(=O)–O–⌬–C(CH₃)₃ | 5,600 | 81 | 64 |
| 4 | (CH₃)₃C–⌬(C₆H₅)–O–P(=O)(–O–⌬(C₆H₅))₂ | 5,900 | 76 | 67 |
| 5 | ((CH₃)₃C–⌬(C₆H₅)–O–)₂P(=O)–O–⌬ | 3,400 | 76 | 61 |

*Example 4*

Molding powders, each consisting of 77 per cent by weight ethylcellulose, 3 per cent montan wax (which serves as a molding lubricant), and 20 per cent of the phosphate specified in Table IV below were prepared by procedure similar to that described in Example 3. The powders were

*Example 5*

A composition was prepared consisting of 80.75 per cent by weight ethylcellulose, 16.25 per cent di-(4-tertiary-butyl-2-phenyl-phenyl) 4-tertiarybutyl-phenyl phosphate, and 3 per cent montan wax. This composition was heated to a temperature of 205° C. and pressed under a pressure of 7 tons per square inch into a mold by the well-known injection molding process to form a molded article. The product had a high gloss, excellent strength characteristics, and a hard surface capable of withstanding well the usual wear to which buttons, cigarette cases, and other articles of like nature are commonly subjected.

Example 6

A plastic composition consisting of 48.75 per cent by weight of ethylcellulose, 47 per cent of mono-(5-tertiary-butyl-2-xenyl)-di-(4-tertiary-butyl-phenyl) phosphate, 4 per cent of ceresin wax and 0.25 per cent of a pigment was prepared by mixing the ingredients in the proportions just stated and passing the mixture at a temperature between 120° and 150° C. through heated compounding rolls until a uniform composition resulted. While hot, the composition was extruded in known manner as a coating on copper wire. The composition extruded smoothly to form a flawless tight coating over the wire. The coated wire was immersed for 7 days in water heated to 70° C., after which the wire was withdrawn and inspected. The coating still adhered tightly to the wire and apparently was unaffected by the treatment. The wire could be handled and bent without breakage or development of other flaws in the coating.

Example 7

A plastic composition consisting of 48.8 per cent by weight of ethylcellulose, 48.8 per cent of mono-(para-tertiary-butyl-phenyl)-di-(5-tertiarybutyl-2-xenyl) phosphate, 2 per cent of ceresin wax and 0.4 per cent of pigment was prepared and extruded as a coating on copper wire as in Example 6. The composition extruded smoothly to form a flawless coating on the wire which was sufficiently hard yet flexible to permit handling and bending of the wire without damaging the coating. The coated wire was immersed for 7 days in water warmed to 70° C. The coating was apparently unaffected by this treatment.

The new plastic compositions may contain ingredients other than those hereinbefore stated. For instance, in addition to the complex phosphates required as plasticizers according to the invention, other plasticizing agents, such as dibutyl phthalate, triphenyl phosphate, etc., may also be present. Furthermore, dyes or pigments may be incorporated with the plastics to produce objects of desired color or shade and, if desired, fillers, e. g. inert substances such as powdered silica, wood flour, etc., may be incorporated in the plastic compositions to increase the bulk thereof.

Many of the new cellulose ether compositions provided by the invention are useful in making fabric coatings for air-craft. In the foregoing Example 1 it has been shown that our new plasticizers often increase both the elasticity and hardness of a cellulose ether treated therewith. These effects tend to increase the tautness of air-craft fabric coated with a film of the plasticized cellulose ether composition. Coatings for air-craft fabrics must have a relatively high elasticity to avoid "ringworming" or failure of the film through embrittlement, (see G. M. Kline, Ind. & Eng. Chem., May, 1938). Heretofore, ethylcellulose has been considered not as satisfactory as the cellulose esters because of the tendency of fabrics coated with it to "slacken." This is a result of plastic stretch under a tension exceeding the yield point of either the unplasticized film or the film plasticized with the plasticizers heretofore used.

The plasticizers of the present invention not only increase the tension required to impart a permanent stretch or "slackness" to the film, but act to reduce moisture transmission and decrease the flammability of the film. Furthermore, by virtue of the fact that the increased yield point is not obtained at the expense of extensibility, the film can tolerate the incorporation of large amounts of pigments such as aluminum, bronze or other colors. These properties combine to make the compositions useful as airplane fabric coating dopes.

The complex triaryl phosphates employed as plasticizers according to the invention are new compounds claimed as such in the co-pending application of C. L. Moyle, Serial No. 224,302, filed August 11, 1938. They are each prepared by reacting a phosphorus oxhalide, e. g. phosphorus oxychloride, with the phenol or phenols corresponding to the aryl radicals desired in the triaryl phosphate product. For instance, phenyl di-(2-cyclohexyl-4-phenyl-phenyl) phosphate may be prepared by heating phosphorus oxychloride with one molecular equivalent or less of phenol, preferably in the presence of a catalyst such as magnesium or magnesium chloride, etc., to form phenyl phosphoric acid dichloride and similarly reacting the latter with two molecular equivalents of 2-cyclohexyl-4-phenyl-phenol.

The present application is a continuation-in-part of our co-pending application, Serial No. 224,320, filed August 11, 1938.

Other modes of applying the principle of our invention may be employed instead of those explained, change being made as regards the compositions herein disclosed, provided the compound or compounds stated by any of the following claims or the equivalent of such stated compound or compounds be employed.

We therefore particularly point out and distinctly claim as our invention:

1. A plastic composition comprising a cellulose ether and between about 5 and about 100 per cent of its weight of a triaryl phosphate having the general formula,

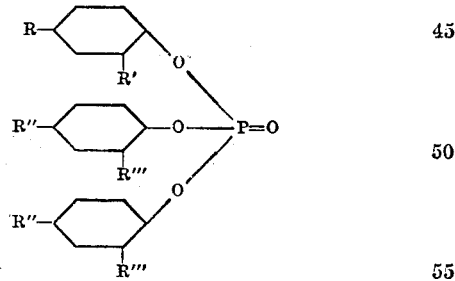

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four.

2. A plastic composition comprising a cellulose ether treated with between about 5 and about 40 per cent of its weight of a triaryl phosphate having the formula,

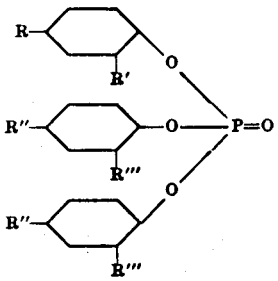

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four; said composition having a hardness index number at least 90 per cent as great as that of the cellulose ether alone.

3. A plastic composition comprising a cellulose alkyl ether treated with between about 5 and about 100 per cent of its weight of a triaryl phosphate having the general formula,

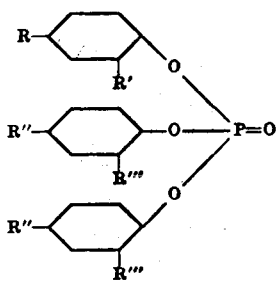

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four.

4. A plastic composition comprising ethylcellulose treated with between about 5 and about 100 per cent of its weight of a triaryl phosphate having the general formula,

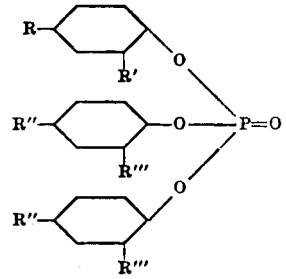

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four.

5. A plastic composition comprising ethylcellulose treated with between about 5 and about 40 per cent of its weight of a triaryl phosphate having the general formula,

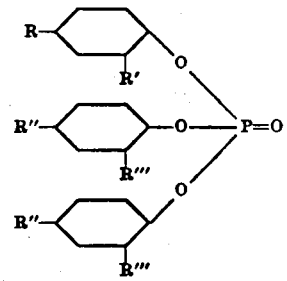

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four; said composition having a hardness index number at least 90 per cent as great as that of the ethylcellulose alone.

6. A plastic composition comprising an ethylcellulose of at least 43 per cent ethoxyl content treated with between about 5 and 100 per cent of its weight of a triaryl phosphate having the general formula,

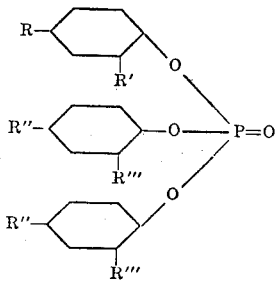

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four.

7. A plastic composition comprising ethylcellulose treated with between about 5 and about 100 per cent of its weight of 4-tertiarybutyl-2-phenyl-phenyl di-(4-tertiarybutyl-phenyl) phosphate having the formula,

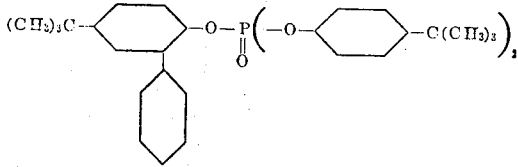

8. A plastic composition comprising ethylcellulose treated with between about 5 and about 100 per cent of its weight of 4-tertiarybutylphenyl di-(4-tertiarybutyl-2-phenyl-phenyl) phosphate having the formula,

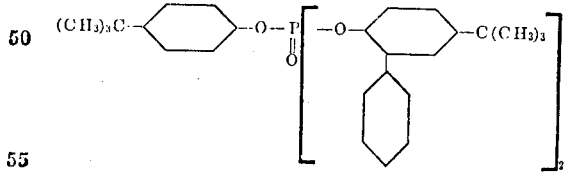

9. A plastic composition comprising an aralkyl ether of cellulose treated with between about 5 and about 100 per cent of its weight of a triaryl phosphate having the formula,

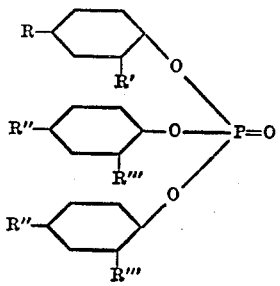

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four.

10. A plastic composition comprising benzyl cellulose treated with between about 5 and about 100 per cent of its weight of a triaryl phosphate having the formula,

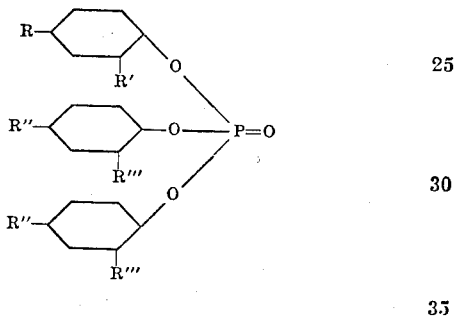

wherein R is a hydrocarbon radical selected from the class consisting of cycloalkyl radicals and hydrocarbon radicals attached through a tertiary carbon atom with the benzene nucleus; R' is a member of the group consisting of tertiary alkyl, cycloalkyl, and aryl radicals; R'' is a member of the group consisting of hydrogen, cycloalkyl radicals, and hydrocarbon radicals attached through a tertiary carbon atom to the benzene nucleus; and R''' is a member of the group consisting of hydrogen and tertiary alkyl radicals, cycloalkyl radicals, and aryl radicals; and at least two of the benzene nuclei shown contain hydrocarbon substituents of the types just named, the total number of such substituents in the molecule as a whole being at least four.

11. A plastic composition comprising benzyl cellulose treated with between about 5 and about 100 per cent of its weight of 4-tertiarybutyl-2-phenyl-phenyl di-(4-tertiary-butylphenyl) phosphate having the formula,

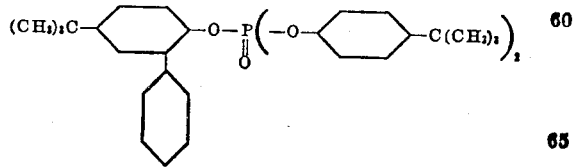

SHAILER L. BASS.
TOIVO A. KAUPPI.
CLARENCE L. MOYLE.